United States Patent [19]

Wessing

[11] Patent Number: 4,527,215

[45] Date of Patent: Jul. 2, 1985

[54] VALVE TYPE VOLTAGE ARRESTER DEVICE

[75] Inventor: Egon Wessing, Münster, Fed. Rep. of Germany

[73] Assignee: Wickmann-Werke GmbH, Witten-Annen, Fed. Rep. of Germany

[21] Appl. No.: 458,476

[22] Filed: Jan. 17, 1983

Related U.S. Application Data

[63] Continuation-in-part of Ser. No. 246,416, Mar. 23, 1981, abandoned.

[30] Foreign Application Priority Data

Sep. 20, 1980 [DE] Fed. Rep. of Germany ... 8025215[U]
Dec. 24, 1980 [DE] Fed. Rep. of Germany ... 3049094[U]

[51] Int. Cl.³ .................................... H02H 9/06

[52] U.S. Cl. .................................... 361/124; 361/127; 361/120; 337/33; 337/34

[58] Field of Search .............. 361/124, 128, 126, 127, 361/120, 56, 119, 118, 117, 104, 125; 337/28, 31, 17, 18, 33, 34

[56] References Cited

U.S. PATENT DOCUMENTS

| | | | |
|---|---|---|---|
| 3,211,956 | 10/1965 | Dornbush | 361/128 X |
| 3,886,411 | 5/1975 | Klayum | 361/120 X |
| 3,889,222 | 6/1975 | Takano et al. | 361/124 X |
| 3,987,343 | 10/1976 | Cunningham | 361/127 X |
| 4,011,485 | 3/1977 | Cunningham | 361/127 |
| 4,015,228 | 3/1977 | Eda et al. | 361/124 X |
| 4,051,546 | 9/1977 | Scheithauer | 361/124 |
| 4,104,693 | 8/1978 | Toda et al. | 361/120 |
| 4,191,985 | 3/1980 | Phillips, Jr. | 361/56 |
| 4,240,124 | 12/1980 | Westrom | 361/127 |
| 4,308,566 | 12/1981 | Imataki et al. | 361/124 X |

*Primary Examiner*—Patrick R. Salce
*Attorney, Agent, or Firm*—Robert E. Burns; Emmanuel J. Lobato; Bruce L. Adams

[57] ABSTRACT

A low voltage valve type arrester device for connection between a domestic electric supply line and earth includes a varistor, a switching device and an encapsulated gas discharge voltage arrester connected in series. The switching device includes two switch members connected together by a solder connection and biased apart by a spring. A fusible link is connected to the two switch members in parallel with the solder connection. When a voltage surge occurs, current flows through the arrester to earth. If the surge is large enough to render the gas discharge arrester continuously conductive, the solder connection melts due to the heat dissipated in the varistor and the two switch members move rapidly apart. The fusible connection rapidly melts by which time the switch members are sufficiently far apart for no arc to form between them.

7 Claims, 3 Drawing Figures

VALVE TYPE VOLTAGE ARRESTER DEVICE

CROSS-REFERENCE TO RELATED APPLICATION

This application is a continuation-in-part of application Ser. No. 246,416 filed Mar. 23, 1981, now abandoned.

BACKGROUND OF THE INVENTION

The present invention relates generally to valve type voltage arrester devices and in particular to such devices for use with low-voltage installations, and is concerned with that type of arrester device which includes a switching device and a spark gap.

Such arrester devices have been used to a considerable extent to protect domestic electric devices, in particular on overhead supply lines leading to individual buildings, from transient or persistent overvoltages. Valve type arrester devices are however now being increasingly used in those houses whose electricity supply is by underground cable because it has been found that overvoltages, that is to say voltage surges, can occur in supply systems which use only underground cables as well as those which use a combination of underground cables and overhead lines. Furthermore, there is an increasing usage in the household of electrical devices which are particularly sensitive to overvoltages.

For the protection of consumer installations, indoor mounted arrester devices are conveniently used which permit a simple connection to the electrical supply system of the house. They can be clamped or arranged in rows on carrier tracks in a manner similar to protective circuit breakers.

Low voltage valve type arrester devices are indispensable with office buildings which have electrical installations, hospitals, lighting towers and with installations which are protected by earth leakage circuit breakers. Undesired switching of the breakers, which can be triggered by overvoltages, can thereby be substantially avoided. However, the protective ability of previously known low voltage valve type arrester devices is only partial. This is due to the fact that the trigger voltage, that is to say the voltage at which the arresting function is initiated, is set considerably higher than the supply voltage with the result that only large voltage peaks are kept out of the domestic supply circuits. The reason that the trigger voltage is set high is due to the construction of the spark gap with which such arrester devices are usually provided, and in particular to the large tolerances of the components which are used in its construction. The spark gap conventionally comprises two electrodes between which is a dielectric material which is subjected to external influences without hindrance with the result that changes in the ambient temperature, atmospheric pressure or air humidity can change the trigger voltage. It must, therefore, be ensured that even with unfavorable atmospheric conditions, the spark gap does not break down at the normal supply voltage but only when an overvoltage is present. Thus under normal conditions the trigger voltage lies so far above the normal or supply voltage that the protective action, for instance for electronic devices, is no longer adequate.

The protective function of the known low voltage value type arrester device is, however, not only imperfect in the lower region of voltage surges but also can not be relied on at high current densities. It can happen that the cut-off or switching device is unable to switch off extreme short-circuit currents but instead an arc forms between the separating switch elements which does not extinguish itself despite the fact that the distance between the elements is increasing during the switching operation. Thus very high short-circuit currents can be led away but on the other hand the imperfect switching means that there is a substantial safety risk.

Accordingly it is an object of the present invention to provide a valve type arrester device, in particular for low voltage installations, whose protective function is fully ensured with a trigger voltage which is slightly above the supply voltage and even with extremely high short-circuit currents.

SUMMARY OF THE INVENTION

According to the present invention, a valve type arrester device comprises two terminals, a switching device, a varistor and two electrodes, all being connected in series, the two electrodes being spaced apart and connected together in a gas tight manner with a dielectric material between the two electrodes, and the two electrodes and the dielectric material together constituting a sealed gas-discharge arrester. According to a further aspect of the present invention there is provided a valve type arrester device including two terminals, a switching device, a varistor and two electrodes all being connected in series, the two electrodes defining between them a gap, and the switching device including a first switch member arranged in heat conducting relationship with the varistor, a second switch member connected to the first switch member, a fusible material connecting the first and second switch members and biasing means urging apart the first and second switch members, the arrester device further including a fusible electrical link connected to the first and second switch members in parallel with the fusible material whereby, in use, when the electrodes have become continuously conductive by virtue of fusion or welding, the first switch member is so heated by the varistor that the fusible material melts and the biasing means urges the first and second switch members apart whereby current then flows only through the fusible electrical link thereby melting the fusible electrical link and switching off the current.

The term "sealed gas discharge arrester" is used in the context of the present invention to refer to a sealed arrester of the type which is commercially available and also referred to as a button arrester. This comprises essentially an annular ceramic body whose opposed surfaces are metallized and finally have an electrode soldered to them.

The interior of such a gas discharge or button arrester is filled with an inert gas such as argon. A spark gap which is encapsulated in this manner is substantially insensitive to external conditions so that the operating or striking voltage, which is predetermined by external parameters, in practice remains constant under all circumstances. The distance by which the electrodes are spaced apart, the gas filling and other constructional features determine the magnitude of the striking voltage which is then fixed and cannot be altered.

In the known low voltage valve type arrester devices the spark gap is formed by two copper or brass discs between which a mica washer is laid. This is then subjected to external conditions without hindrance. In the arrester device in accordance with the invention, the unit formed by the electrodes and the interposed mica washer is replaced by the button arrester.

By virtue of the constant properties of a button arrester with regard to its triggering behavior, the striking voltage can, in accordance with the choice of the parameters, be set very near to the nominal or supply voltage without any fear that the arrester device will trigger unintentionally at the supply voltage. Thus in the lower region of possible voltage surges a very high degree of security can be achieved since even small overvoltages can be supressed from a domestic electric supply system. With this type of overload the protection afforded is adequate and reliable.

With high overvoltages in connection with extreme short-circuit currents there are difficulties not so much in connection with the triggering behavior as with the switching facility, that is to say the ability of the arrester device to interrupt an excessive short-circuit current of the order of e.g. 6.5 KA. The invention provides assistance in this connection by the use of a conventional fusible link, that is to say a fuse, of a type which is known per se. Such fuses, especially when filled with sand, can switch short-circuit currents of 6 to 10 KA. The cut-off procedure under extreme conditions occurs somewhat as follows.

After the spark gap has become continuously conducting by virtue of fusion or welding, the varistor progressively heats the first switch member, preferably in the form of a disc, to such an extent that the fusible material, preferably in the form of a solder connection, melts and the second switch member, preferably in the form of a cut-off plunger, is lifted under the biasing force of the biasing means, such as a spring, and the plunger moves a predetermined distance from the disc. Until the solder connection melts and is broken virtually all the current flows through it while only a small proportion flows through the fusible electrical link, for instance in the form of a conventional encapsulated fuse, which is connected in parallel with the solder connection due to the fact that the fuse has a resistance equal to ten or even more times that of the solder connection. At the moment of the parting of the solder connection, the electrical load on the fuse increases dramatically with the result that its fusible wire explosively vaporizes. At this instant, the plunger has moved so far from the disc under the action of the mechanical biasing force that a spark-over between the plunger and the disc can not occur; on the contrary the rapidly increasing distance between them ensures that such a spark-over becomes ever more unlikely. With the aid of the fuse it is thus ensured that, in the critical phase in which the plunger is lifted up from the disc, the current load at this point is briefly so reduced as a consequence of its passage via the fuse that no arc is struck between the plunger and the disc.

The construction described above of a low voltage valve type arrester device in accordance with the invention is of the single pole-type, which is to say that it is connected between a current conductor and earth, and with multiphase conductors between a single phase and earth. With three phase supplies three or four arrester devices are thus required depending on the type of earthing.

It can be advantageous to use two pole arrester devices which by virtue of their symmetrical construction lead to a significant space saving but which otherwise have the same active electrical components. These include the spark gap, the varistor, the switching device and if required the fusible link.

Further features and details of the invention will be apparent from the following description of two specific embodiments which is given by way of example only.

DETAILED DESCRIPTION OF PREFERRED EMBODIMENTS

Figure 1:
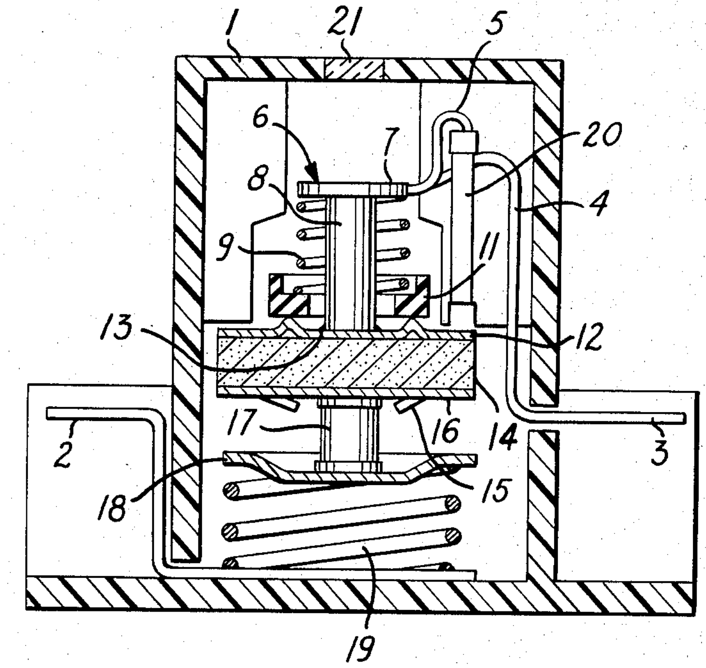
FIG. 1 is a schematic elevational view, partly in section, of the interior of a first embodiment of low voltage valve type arrester device according to the invention.

The low voltage arrester device shown in FIG. 1 comprises essentially a housing 1 on the sides of which two terminals 2 and 3 are arranged. Terminal 3 is intended to be connected to the power supply line of, e.g., a house while terminal 2 is intended to be connected to an earth or ground connection.

Within the housing there is a lead 4 which is connected to the terminal 3 and leads to a cut-off plunger 6 which comprises a plate 7 and a sleeve 8. A further lead 5 electrically connects the plate 7 to one end cap of a fusible link or fuse 20. The cut-off plunger 6 and the fuse 20 are components of a switching or cut-off device which interrupts the current path through the arrester device during a break down when the load is so great that the spark gap has become continuously conducting due to welding effects. The switching device includes a helical compression spring 9 which is compressed between the underside of the plate 7 and a shell member 11 which is composed of electrically insulative material. The sleeve 8 is soldered by means of solder 13 centrally on to a disc 12 below which a varistor 14 is arranged. In addition, the other end cap of the fuse 20 is electrically connected to the disc 12, for example, by means of a clip (not shown), a cold pressure weld or a spot weld. As shown in FIG. 1, the shell 11 rests on protuberances protruding upwardly of the disc 12 and the shell 11 is biased into engagement with the disc protuberances by the compressive force exerted by the compression spring 9.

Below the varistor 14 there is a further disc 16 whose diameter is approximately or exactly the same as that of the varistor and against which a button arrester 17 is urged from below. To center the button arrester 17, tongues 15 are bent out of the plane of the disc 16 between which there is space for one of the connecting electrodes of the arrester. The other electrode of the arrester engages a trough-shaped disc 18 which is biased upwardly by a spring 19. The spring 19 rests on an extension of the terminal 2.

The arrester comprises an annular housing of high quality aluminium oxide ceramic whose end faces are metallized and connected in a gas-tight manner by hard solder to respective metallic discs which constitute the arrester electrodes. The space within the annular housing between the two electrodes is filled with an inert gas, such as argon, and constitutes the spark gap within which the gas discharge process occurs.

In use, the terminal 3 is connected to a domestic electric supply line and the terminal 2 is connected to earth. In normal operation, the spark gap of the arrester presents an extremely large impedance so that effectively zero current flows to earth. The spark gap within the arrester is so set that a discharge or spark can occur at a voltage slightly above the maximum normal voltage that is to be expected on the supply line and below the voltage at which sensitive elements, such as semiconductor devices of domestic electric appliances, may suffer damage. If a voltage surge should occur, due to lightening or due to the induction of a large voltage in the supply line by some means or as a mere transient voltage fluctuation, having a value above the preset value, a discharge will occur in the arrester which therefore suddenly presents a substantially reduced impedance. A current flows to earth thus eliminating or substantially reducing the voltage peak to which the domestic appliances are subjected. Due to the fact that the spark gap is sealed from the atmosphere, it is not subjected to variations in humidity or pressure or to atmosphere pollution and the voltage at which the arrester 'strikes' or is triggered therefore remains substantially constant.

If the voltage surge should be of prolonged duration or of considerable strength, the spark gap may become continuously conductive. This leads to an even greater current to pass the arrester and the heat generated by the varistor 14 heats the disc 12 to such an extent that the solder 13 melts and the spring 9 then quickly urges the plunger 6 upwardly and away from the stationary disc 12. By separating the plunger 6 and the disc 12, the only conductive path available to the short-circuit current passing through the arrester is through the fuse 20 which is thus caused to fuse in an extremely short time. The resistance of the fuse is ten or more times that of the remaining components of the separating or switching device which thus ensures that it is fused only after the solder connection has been broken, i.e., the solder 13 has melted. At the time the sleeve 8 and the disc 12 come out of contact, there is virtually no voltage between them, due to the fact that the fuse 20 has not yet ruptured, so that no arc is struck between them. Although the fuse 20 melts within a few milliseconds, this time is sufficient to permit a sufficiently great distance to appear between the plunger 6, that is to say the lower edge of the sleeve 8, and the upper surface of the disc 12, so that a renewed flow, i.e., a sparking over, of the current is impossible. With the aid of the fuse 20, the switching process occurs reliably in what may be thought of as two steps and the melting of the fuse 20 generally occurs with such violence that no arc can occur within the fuse or between its end caps.

After the switching device has interrupted the current flowing through the arrester device, the plunger 6 is pushed so far upwards within the housing by the spring 9 that the plate 7 is easily visible through an aperture or window 21. To improve the visibility of the plate 7 it can be colored, e.g., red. When the plate 7 may be seen immediately behind the window 21, this indicates that switching has occurred and the entire valve type arrester device must be exchanged for a new one.

Precise details of the terminals 2 and 3 are not illustrated in FIG. 1 but these may be of any desired conventional type of connector or the like.

Figure 2:
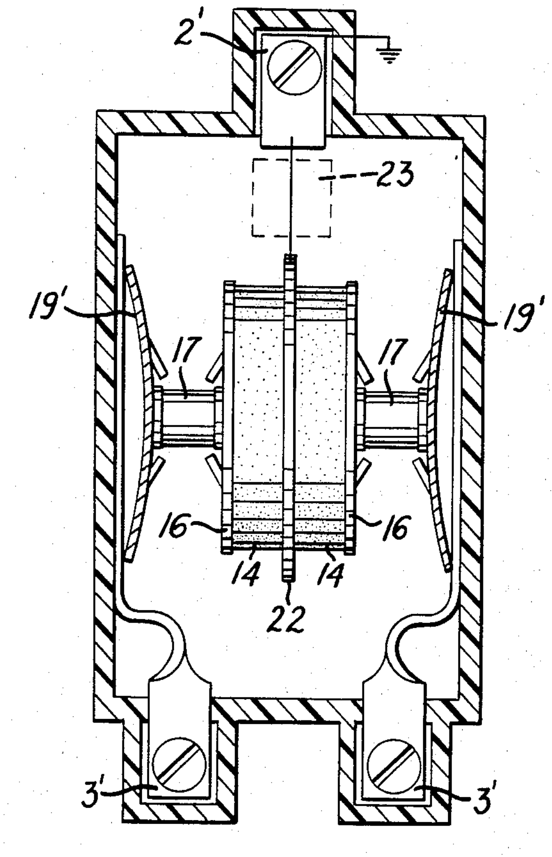
FIG. 2 is a schematic plan view, partly in section, of a second embodiment of low voltage valve arrester device according to the invention.

FIG. 2 is a schematic and partially sectioned plan view of a two pole valve type arrester device. The housing, which as in the first embodiment illustrated in FIG. 1 is preferably made of plastics material, has on one side a connection 3',3' for each of two phases of a multiphase supply while on its other side a common earth or ground connection 2' for both phases is present. The connections 3' for each phase extend separately laterally within the housing and lie against the housing wall along both inner longitudinal sides in the form of plates. Plate spring-type discs 19' bear against these plate-like continuations of the connections 3' and with the aid of bent up lugs each achieve a centering of a button arrester 17 received in their center.

The opposed electrodes of the button arrester 17 engage two identical discs 16 of which one was present in the first embodiment. The discs 16 lie against varistors 14 which were also described in connection with the first embodiment and between which is a heating disc 22 in the manner of a sandwich. Contact between the various components symmetrically arranged between the plate-like extensions of the contact connections 2' and 3' is achieved by means of the spring force of the plate spring-type discs 19' which have sufficient travel in order to be able to compensate for shrinkage of the button arrester 17 in the event of overstressing due to baking away.

Figure 3:
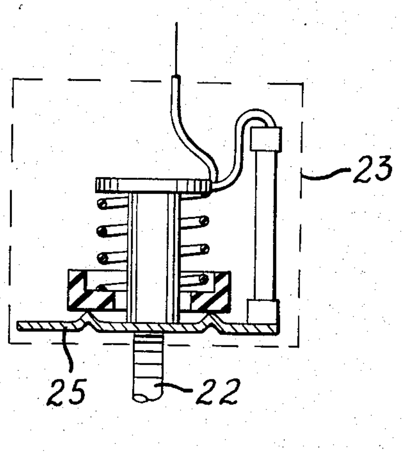
FIG. 3 is a schematic elevational view, partly in section, of the switching device shown in block form in FIG. 2.

Coupled to the heating disc 22 is a switching device 23 which is only shown schematically in FIG. 2 by means of a chain line rectangle. The switching device 23 is shown in FIG. 3 and comprises an arrangement similar to that described in connection with FIG. 1 but instead of the disc 12, a plate-like projection 25 is formed on the heating disc 22 to provide a solder surface for the solder 13 and the plunger sleeve 8 soldered to it. In one preferred construction, the heating disc 22 together with the projection 25 have approximately the shape of a figure eight and the plate-like projection can be rotated through 90° about the longitudinal axis with respect to the heating disc 22. It is of importance merely that a sufficiently large thermal transfer should occur between the heating disc 22 and the plate-like projection so that the solder 13 will melt when necessary. A movable conductor extends in the conventional manner from the cut-off device 23 to the connector 2' which is connected to earth.

If the switching device 23 is to be entirely omitted the heating disc 22 can be connected directly to the connection 2' in the manner shown in FIG. 2.

The embodiment shown in FIG. 2 is particularly suitable for three phase supplies with which in addition to the three phases, a neutral conductor is provided with a valve type voltage arrester to earth. Only two arresters are thus required which by virtue of their compact construction only take up half the space which would be required by four arresters of the type described in connection with FIG. 1. These space-saving properties are of particular importance in cramped conditions.

It will be appreciated that a great many modifications may be made to the embodiments described above without departing from the spirit and scope of the present invention as defined in the appended claims.

What I claim is:

1. A valve type arrester device including two terminals, a switching device, a varistor and two electrodes, all being connected in series, said two electrodes defining between them a gap, said switching device including a first switch member arranged in heat conducting relationship with said varistor, a second switch member connected to said first switch member, fusible material connecting said first and second switch members and biasing means urging said first switch member and said second switch member apart, said arrester device further including a fusible electrical link connected to said first and second switch members in parallel with said fusible material whereby, in use, when said electrodes have become continuously conductive by virtue of fusion or welding said first switch member is so heated by said varistor that said fusible material melts and said biasing means urges said first and second switch members apart whereby said current then flows only through said fusible electrical link thereby melting said fusible electrical link and switching off said current.

2. An arrester device as claimed in claim 1, wherein said two electrodes are connected together in a gas-tight manner and together constitute a sealed gas discharge arrester.

3. An arrester device as claimed in claim 2, wherein said varistor is of circular section, said arrester device further including a circular disc disposed between said varistor and said sealed gas discharge arrester, the diameter of said circular disc being substantially equal to that of said varistor.

4. An arrester device as claimed in claim 3, wherein said circular disc is provided with projecting tongues positioned to centrally locate said sealed gas discharge arrester relative to said circular disc.

5. An arrester as claimed in claim 1, wherein the electrical resistance of said fusible electrical link is at least ten times that of said fusible material.

6. A valve type arrester device including a first terminal, a second terminal, a third terminal, a switching device, a first varistor, a second varistor, a first pair of electrodes and a second pair of electrodes, said first terminal, said switching device, said first varistor, said first pair of electrodes and said third terminal all being connected in series and said second terminal, said switching device, said second varistor, said second pair of electrodes and said third terminal all being connected in series, each said pair of electrodes defining between them a gap, said switching device including a first switch member arranged in heat conducting relationship with said first and said second varistors, a second switch member connected to said first switch member, fusible material connecting said first and second switch members and biasing means urging said first switch member and said second switch member apart, said arrester device further including a fusible electric link connected to said first and second switch members in parallel with said fusible material whereby, in use, when at least one of said pairs of electrodes has become continuously conductive by virtue of fusion or welding said first switch member is so heated by at least one of said varistors that said fusible material melts and said biasing means urges said first and second switch members apart whereby the current then flows only through said fusible electrical link thereby melting said fusible electrical link and switching off said current.

7. An arrester device as claimed in claim 6, wherein the electrodes of each said pair of electrodes are connected together in a gas-tight manner and together constitute a sealed gas discharge arrester.

* * * * *